United States Patent [19]

Okuda

[11] Patent Number: 4,938,493
[45] Date of Patent: Jul. 3, 1990

[54] TRUCK WITH A HAND-OPERTABLE BED

[75] Inventor: Genzaburo Okuda, Minami Kawachi, Japan

[73] Assignee: Kabushiki Kaisha Okudaya Giken, Osaka, Japan

[21] Appl. No.: 227,664

[22] Filed: Aug. 2, 1988

[30] Foreign Application Priority Data

Mar. 29, 1988 [JP] Japan .................................. 63-77624

[51] Int. Cl.$^5$ ............................................ B62D 21/14
[52] U.S. Cl. ................................. 280/43.12; 137/557;
                                     340/626; 340/666; 414/21
[58] Field of Search ...................... 280/43.12; 137/557;
            212/153, 155; 414/21; 340/626, 679, 666

[56] References Cited

U.S. PATENT DOCUMENTS

| | | |
|---|---|---|
| 3,205,909 | 9/1965 | Oldfield ................................. 137/557 |
| 4,423,751 | 1/1984 | Roettgen ............................... 137/557 |
| 4,497,501 | 2/1985 | Kedem .................................. 280/43.12 |
| 4,533,908 | 8/1985 | Fujikawa ............................... 340/626 |

FOREIGN PATENT DOCUMENTS 61-3726  2/1986  Japan .
61-38844 11/1986 Japan .

Primary Examiner—Charles A. Marmor
Assistant Examiner—Eric Culbreth
Attorney, Agent, or Firm—Harold Gell

[57] ABSTRACT

This invention discloses a truck with a hand-operatable bed of which the front side under surface is provided with a pair of front wheels and of which the rear side under surface is supported by a hydraulic cylinder, for lifting or lowering the bed, mounted on a pair of rear wheels by means of bearings, which is characterized by being further provided with an overload-sensing device and an alarm-raising device to be put into operation according to the sensing of the overload-sensing device. Because operators can be told about an overload immediately by the devices, they do not have to keep a plunge pump working without being aware of an overload applied on the cylinder as did before. What is more, as they can realize whether the cause of not feeding oil to the cylinder has come from troubles in pressure lines or an overload, they can take measures against the cause at their earliest possible, with the result that the safety and the operatability in handling the truck are improved greatly.

15 Claims, 8 Drawing Sheets

TRUCK WITH A HAND-OPERTABLE BED

This invention concerns a truck with a hand-operatable bed. More particularly, it concerns a truck that has, for example, a forked bed of which the front side under surface is provided with a pair of front wheels and of which the rear side under surface is supported by a jack mounted on a pair of rear wheels by means of bearings, wherein the jack which includes a hydraulic cylinder and a plunger pump is designed to lift or lower the forked bed with the hydraulic cylinder by the swivelling of a truck handle to pump oil into or out of the plunger pump.

Hitherto, there has been used such a bed for trucks that works only under a certain limit of load with the aid of an overload prevention valve adapted to feed back oil to an oil tank from a hydraulic cylinder when the hydraulic cylinder is overloaded even though the oil is fed in it by means of a plunger pump.

As seen from the above, the prior art has been devised only to avoid an overload to be applied to a hydraulic cylinder, so that operators sometimes tend to keep a plunger pump working without being aware of an overload applied to the cylinder. Because of that, one problem is that it takes too much time until they notice an overload. Also, even when the pressure lines of a hydraulic cylinder are chocked with dust or worn off after a long use so heavily as not to be able to feed oil to the cylinder, another problem is that it is hard for them to realize if the cause of not feeding oil to the cylinder has come from such trouble or an overload.

Under the circumstances, the present inventor made intensive studies to eliminate above-mentioned problems and finally accomplished this invention by a truck with a hand-operatable bed of which the front side under surface is provided with a pair of front wheels and of which the rear side under surface is supported by a hydraulic cylinder, for lifting or lowering said bed, mounted on a pair of rear wheels by means of bearings, characterized by being further provided with an overload-sensing device and an alarm-raising device which is put into operation according to the sensing of said overload-sensing device.

Accordingly, it is an object of this invention to provide a truck with a hand-operatable bed that tells operators about an overload thereon with an alarm and causes them to stop useless pumping.

The above and other objects and features of this invention will appear more fully hereinafter from a consideration of the following description taken in connection with the accompanying drawing wherein one example is illustrated by way of example. In the drawing:

FIG. 7 is a cross-sectional side view of the handle of which the top is provided with the lever.

FIG. 8 is a cross-sectional elevational rear view of the joint portion of the handle.

Figure 2:
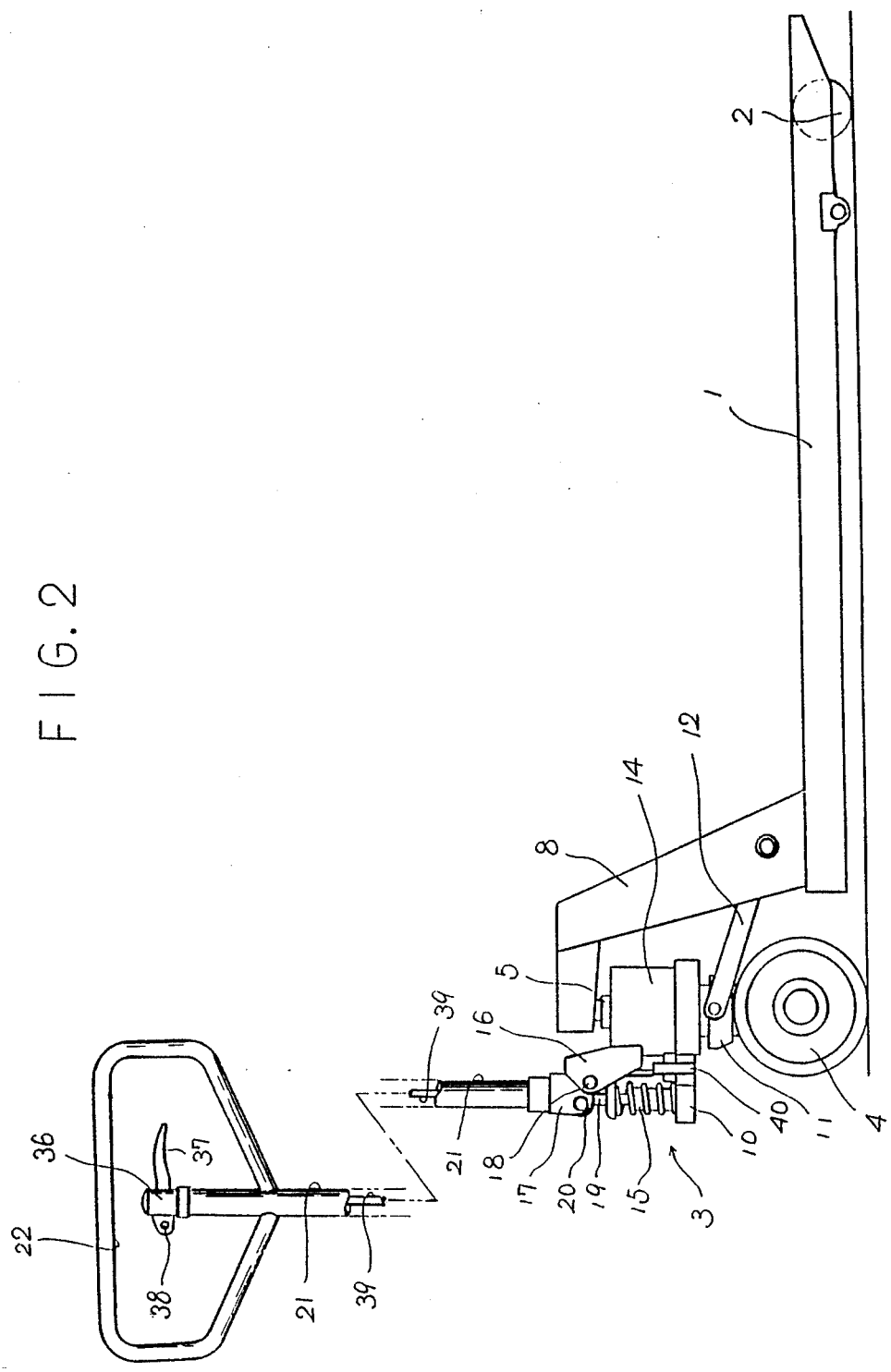
FIG. 2 is a general side view of a truck of this invention.
Figure 3:
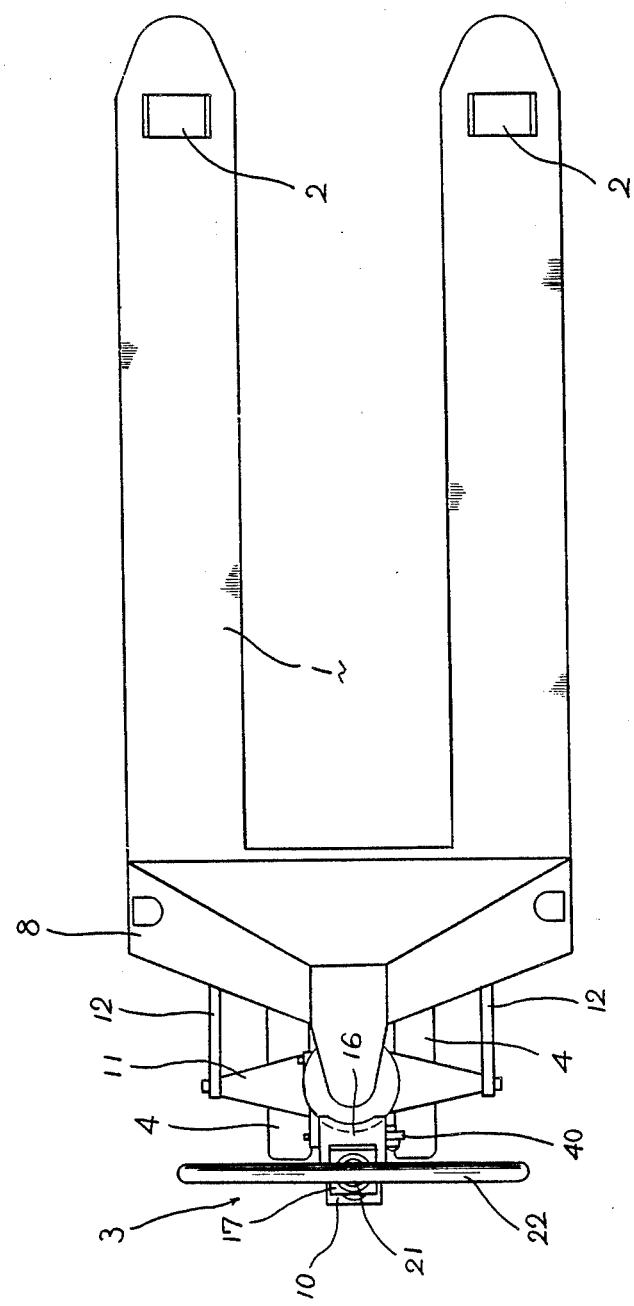
FIG. 3 is a general plan view of the above truck.
Figure 4:
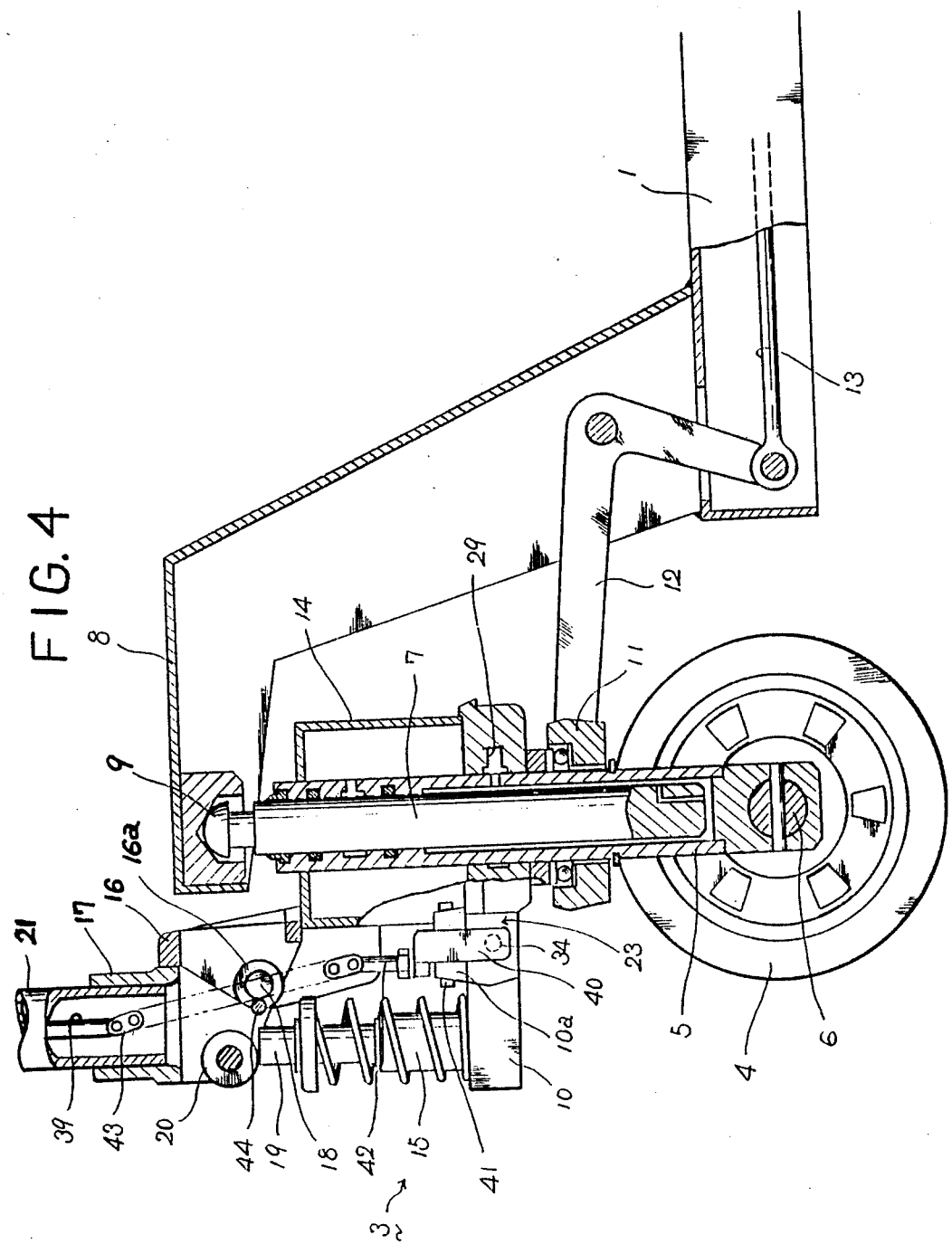
FIG. 4 is a partially enlarged side view of the rear portion of the above truck.

In order that this invention may be more clearly understood, reference will now be made on the whole structure according to the accompanying drawing. As shown in FIGS. 2 to 4, a forked bed 1 on which a load is to be placed is provided with a pair of front wheels 2,2 near its front end, which are rotatably fixed thereto so as to be projectable downward. A jack 3 for lifting or lowering the rear part of the bed 1 is mounted on a hydraulic pressure switching mechanism 10 supported by the rear wheels 4,4. The jack 3 includes a cylinder 5 of which the lower end is provided with a wheel shaft 6 to which the rear wheels 4,4 are secured by means of bearings. A semi-spherical upper end 9 of a ram piston 7 is put in a recess provided to an elevated rear end 8 of the bed 1.

The hydraulic pressure switching mechanism 10 is situated beside the cylinder 5. A pivotal plate 11, which is pivotally fixed to around the cylinder 5, serves to downwardly project the front wheels 2,2 by means of an arm 12 and a rod 13 connected with each other when the ram piston 7 is lifted up by the hydraulic pressure. A pressure oil tank 14 is disposed on the hydraulic pressure switching mechanism 10 in such an unmovable manner as to surround the cylinder 5, to which a plunger pump 15 feeds pressured oil.

Provided behind the upper part of the pressure oil tank 14 is a handle base bracket 16. As shown in FIG. 7 and 8, a handle base 17 can be swivelled to and fro around a pair of rotatable pins 18,18 fixed to the bracket 16 with the handle 21 put in it, whereby a pressure roller 20 fixed to the handle base 17 with bearings can downwardly press a plunger piston 19 of the plunger pump 15 so as to feed oil. The top of the handle 21 is formed into such a loop 22 that operators can readily move the truck by holding it.

Figure 5:
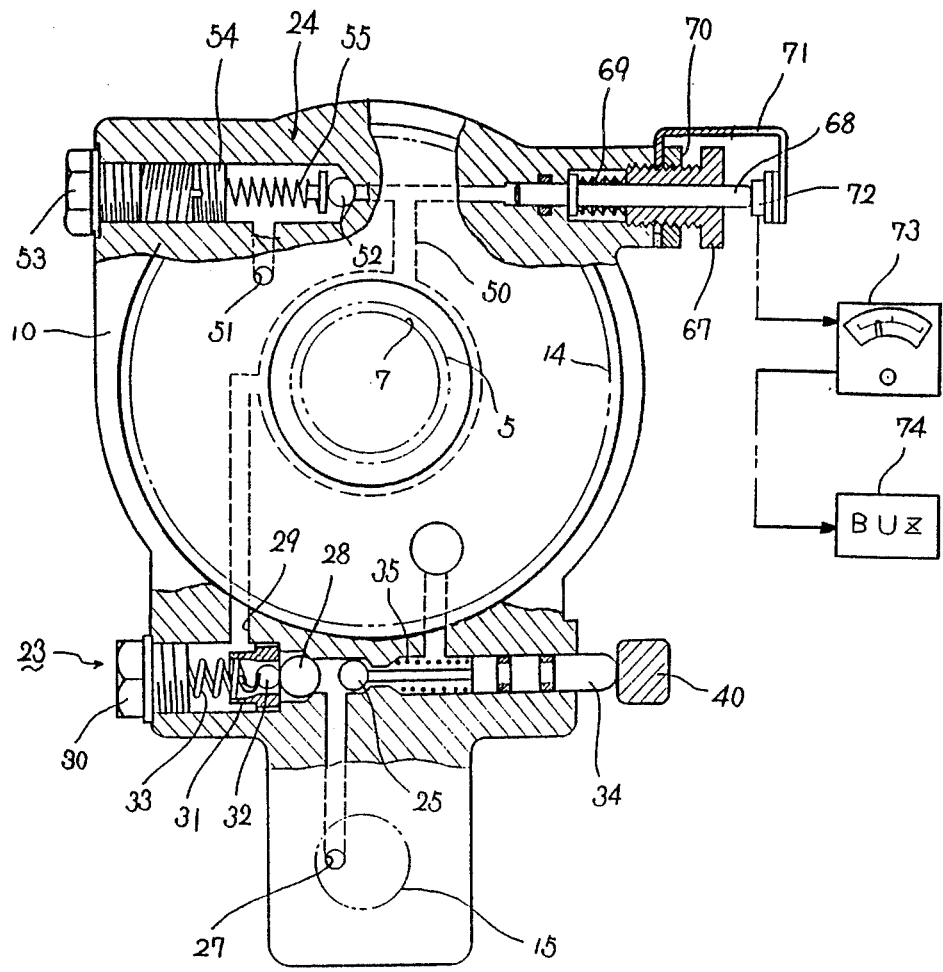
FIG. 5 is a general cross-sectional plan view of a hydraulic pressure switching mechanism.
Figure 6:
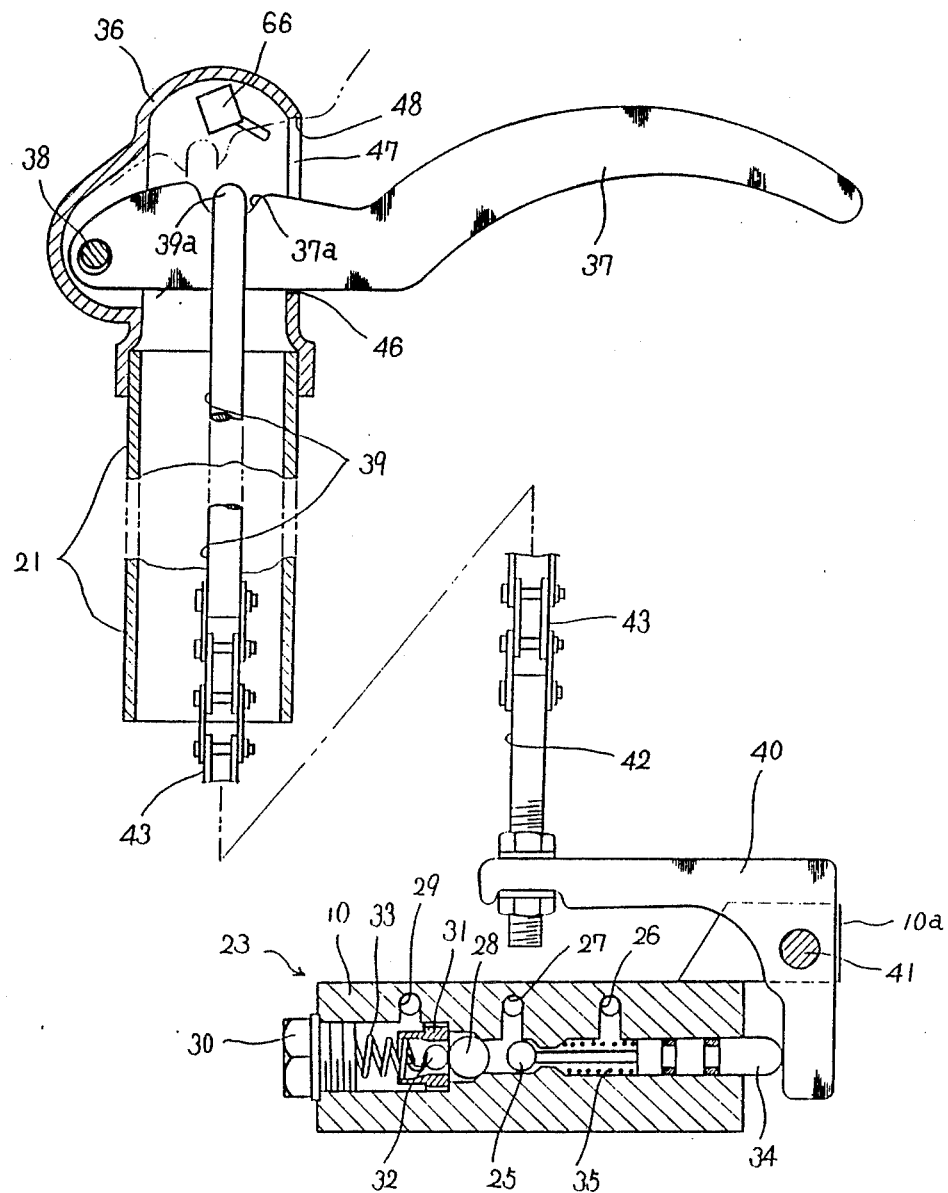
FIG. 6 is a cross-sectional side view of a handle with a lever and a hydraulic pressure switching valve.

As shown in FIGS. 5 and 6, a hydraulic pressure switching device 23 and an overload prevention valve 24 are provided to the hydraulic pressure switching mechanism 10. An oil tank port 26 communicates with a plunger pump port 27 with a ball-type oil-intake checking valve 25 put between. Likewise, the plunger pump port 27 communicates with a cylinder port 29 with a pressure ball 28 of the hydraulic pressure switching device 23 put between. The back pressure acting on the pressure ball 28 can be balanced with the oil pressure inside the cylinder 5 by means of a throttling ball 32 put in a valve retainer 31, both of which are pressed against the pressure ball 28 by a spring 33 on a plug 30.

The structure is such that corresponding to the depth of the oil-intake checking valve 25 inserted by a push rod 34, a path between the oil tank port 26 and the plunger port 27, and a path between the plunger port 27 and the cylinder port 29 can be opened so that oil can pass therethrough.

In this connection, when the path between the oil tank port 26 and the plunger port 27 is opened by inserting the push rod 34, resisting the force of a spring 35, the plunger pump 15 is put in the neutral position. When both the paths between the oil tank port 26 and the plunger port 27, and between the plunger port 27 and the cylinder port 29 are opened by further inserting the push rod 34, the oil tank port 26 and the cylinder port 29 communicate with each other so that oil in the cylinder 5 can be fed back to the oil tank 14 at a desired rate by the restriction of the valve retainer 31 and the throttling ball 32. In the meantime, the push rod 34 of which the end is provided with the oil-intake checking valve 25 is usually pressed against an L-shaped pivotal member 40 outside, which will be described later.

As shown in FIGS. 6 and 7, the top of the handle 21 is covered with a cap 36 in which the base of the a hydraulic pressure switching lever 37 is put, secured by a pin 38 fixed thereto. A rod 39 is suspended inside the handle 21 with a hook 39a at its upper end being hooked on to a recess 37a on the upper edge of the lever 37. On the other hand, the L-shaped pivotal member 40, which is pivotally fixed to a flange 10a of the hydraulic pressure switching mechanism 10 with a pin 41, keeps contact with the rear end of the push rod 34 with the inside surface of one of its arms. The other of arm 40, is connected to an adjustable bolt 42 attached to the lower end of a chain 43 with nuts and washers.

The chain 43 spans between the lower end of the rod 39 and the upper end of the bolt 42 in such a flexible manner as to be able to bend backward on a chain guide pin 44 when the handle 21 is swivelled around a pair of right and left pivotal pins 18,18 which are inserted into a pair of inner plates of the handle base bracket 16, as shown in FIG. 8, the chain guide pin 44 being horizontally supported by a pair of inwardly projecting portions 16a,16a on the inner plates of the handle base bracket 16. Such is the structure that the chain 43 is prevented by the chain guide pin 44 from coming into contact with the top of the plunger pump 15 when bent backward in association with the handle 21, which is swivelled to and fro between the upright and the tilting positions for pumping the plunger pump 15.

As shown in FIGS. 6 and 7, a hole 47 with three notches 45,46,48 and a circular guide surface 49 on its inside is provided in the upper part of the handle 21, whereby operators can switch the hydraulic switching device 23 by using the lever 37.

That is, to elevate bed 1, the lever 37 is engaged with the notch 45; when the hydraulic pressure switching device 23 is to be put in the neutral position, the lever 37 is engaged with the notch 46; and when the bed 1 is to be lower, the lever 37 is transfered to the notch 48 slowly with the aid of the circular guide surface 49.

More particularly, when a load placed, for example, on a pallet is transfered to the truck, the lever 37 is engaged with the notch 45; then, the push rod 34 is allowed to retreat, which causes the oil-intake checking valve 25 attached to the head of the push rod 34 to intercept the communication of the oil tank port 26 and the plunger port 27. As the upright handle 21 is swivelled to and fro around the pins 18,18, oil is sucked in the plunger pump 15 through the oil-intake checking valve 25, and then fed to the cylinder through the pressure ball 28 so as to protrude the ram piston 7 and thereby elevate the bed 1.

When the truck is moved with the bed 1 kept elevated, the lever 37 is engaged with the notch 46; then the push rod 34 is pushed in by the arm of the L-shaped pivotal member 40 and keeps the oil-intake checking valve 25 open as shown in FIG. 6, which allows the hydraulic pressure switching device 23 to stay in the neutral position. Thus, the plunger pump 15 is disconnected from the ram piston 7, and the bed 1 is maintained at a constant height even though the handle 21 is swivelled while the truck is being moved.

Also, when the bed 1 is lowered to unload a cargo, the lever 37 is slowly engaged with the notch 48 by the use of the circular guide surface 49, as shown in FIG. 7. Then the arm of the L-shaped pivotal member 40 pushes the push rod 34 innermost and makes the oil-intake checking valve 25 butt against the pressure ball 28 so as to open the path connecting the cylinder port 29 and the plunger port 27. The pressured oil in the cylinder 5 can flow back to the oil tank 14 by the throttling action of the pressure ball 28 and the throttling ball 32; as a result, the ram piston 7 gets in the cylinder 5 at a desired slow speed, and lowers the bed 1 safely. At this moment, the lever 37 can be put in the notch 45 simply by setting free from the notch 48, and this allows the hydraulic pressure switching device 23 to switch its position so as to elevate the bed 1.

Figure 1:
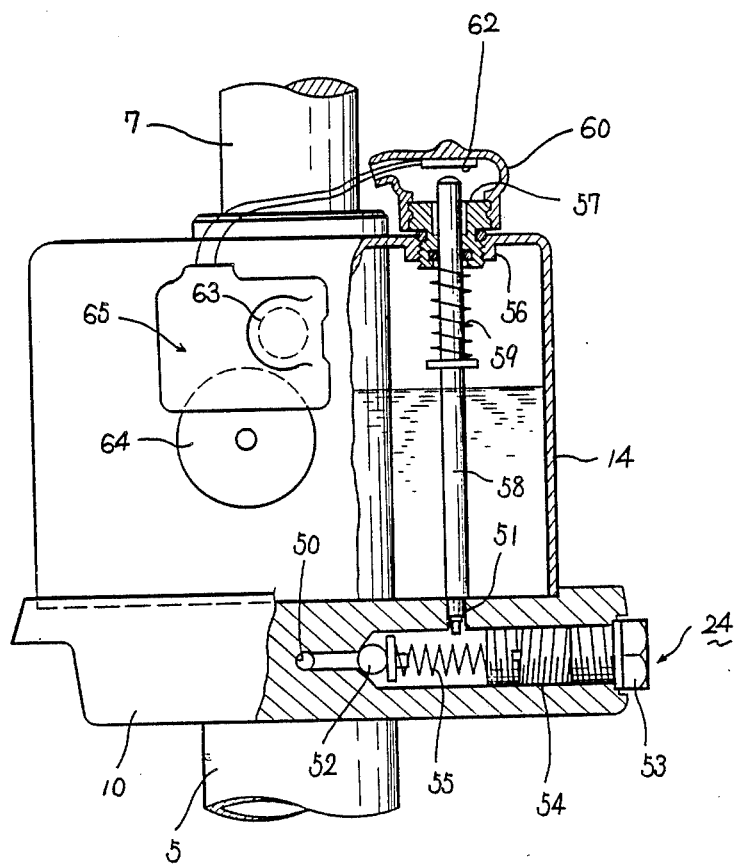
FIG. 1 is a partially cut-away elevational view of an alarm-raising device of this invention.

In order to prevent the bed 1 from suddenly lowering by operators, who sometimes tend to switch the lever 37 to the notch 48 carelessly at a time, there is provided an electric switch 66 inside the handle cap 36, which is connected to a sound-producing apparatus 65 shown in FIG. 1. Thus, when the lever 37 is suddenly engaged with the notch by operators, the switch 66 is energized and tells them to take care with the sudden lowering of the bed to follow, whereby they can avoid accidents by disengaging the lever 37 from the notch 48 and reengaging it therewith slowly.

As shown in FIGS. 1 and 5, the overload prevention valve 24 serves to avoid overloading on the ram piston 7 with the aid of a ball-type release valve 52 by feeding back oil from a release port 50 of the cylinder 5 to a drain port 51 of the oil tank 14. Disposed inside the overload prevention valve 24, the outer end of which is sealed by a plug 53, are an adjusting screw 54, a spring 55, and the release valve 52, the screw 54 being used here to adjust the strength of the spring 55 pressing the release valve 52 against an opening of the release port 50 in such a way that when the inside oil pressure of the cylinder should exceed a given limit, the release valve 52 can be pushed back against the spring 55 so as to let in oil therethrough. As seen from the above, the strength of the spring 55 can be adjusted variously with the change in the position of the adjustable screw 54, so that operators can preset the upper weight limit of a load to be placed on the bed 1 by adjusting the strength of the spring 55 by the use of the screw 54.

A sensing rod 58 passes through a bore in an externally threaded stopper 57 which is screwed into an internally threaded hole 56 used to put oil in the tank 14. It is covered with a rubber cap 60. The lower end of sensing rod 58 is positioned in the drain port 51. The sensing rod is designed to move up and down freely in the vertical direction, through the bore in stopper 57 and drain port 51. The lower end keeps the drain port 51 into the oil tank 14 closed with the force of a spring 59 and its own weight. An electric switch 62 is disposed just above the top of the sensing rod 58 inside the rubber cap 60. Sensing rod 58 is lifted up by pressurized oil flowing through the release valve 52 due to an increase in oil pressure inside the cylinder 5 caused by an overload. Oil flows back into the oil tank 14 through the drain port 51 when the pressure on the lower end of the sensing rod 58 overcomes the spring bias of spring 59. As a result, the top of the sensing rod 58 is brought into contact with the switch 62 inside the rubber cap 60, which permits electric current to flow to the sound-producing apparatus 65 so as to sound a speaker 64 whereby operators can be told about the overload.

Inasmuch as the switch 62 is housed inside the rubber cap 60, not only is the switch protected from accidental shocks but also it enables operators to check battery 63 or the sound-producing apparatus by pushing the rubber cap 60 from outside in such a way that the switch 62 and the top of the sensing rod 58 come into contact with each other.

The alarm system is devised in this way and the sound-producing apparatus 65 can also include various types of sound-synthesizing circuits, whereby operators can immediately be informed of a sudden increase or decrease of pressure inside the cylinder 5 due to an overload or accident.

Moreover, according to this invention, another type of an overload alarming device can also be provided for the hydraulic pressure switching system 10. It is on the opposite side of the overload prevention valve 24, as shown in FIG. 5. That is, there is provided a hole of which one end communicates with the release port 50 and of which the other is sealed with a bored screw 67. A pressure rod 68 with a flange near its head is put in the bore of the screw 67, and a belleville spring 69 is put between the flange of the pressure rod 68 and the top of the screw to bias the pressure rod 68 toward the release part 50. A pressure sensing switch 72 is mounted on one of the arms of a U-shaped leaf spring 71, of which the other is held between a lock nut 70 and screw 67 on the hydraulic pressure switching system 10.

The overload alarming device is provided with such a structure that when the pressure inside the cylinder 5 is raised relative to external ambient pressure by an overload placed on the bed 1, the pressure differential pushes the pressure rod 68 back against the resistance of the belleville spring 69, the end of the pressure rod 68 is pressed against the pressure sensing switch 72, which causes a pressure indicator 73 to show the inside pressure exerted on the top of the pressure rod and a buzzer 74 to sound so as to inform operators of an overload.

While there has been described a preferred form of this invention, modifications and variations are obviously possible in the light of the above teachings. It is therefore to be understood that within the scope of the claims, this invention may be practiced otherwise than as specifically described.

As described above, according to this invention, a truck with a hand-operatable bed 1 of which the front side under surface is provided with a pair of front wheels 2,2 and of which the rear side under surface is supported by a hydraulic cylinder 5 for lifting or lowering said bed 1 mounted on a pair of rear wheels 4,4 by means of bearings is further provided with an overload-sensing device 62/72 and an alarm-raising device 64,65/73,74 to be put into operation according to the sensing of said overload-sensing device, so that operators can be told about an overload immediately. Therefore, they have become unnecessary to keep a plunge pump working without being aware of an overload applied on the cylinder 5 in a conventional manner. What is more, as they can realize whether the cause of not feeding oil to the cylinder has come from troubles in pressure lines or an overload, they can cope with the cause at their earliest possible. As a result, the safety and the operatability in handling the truck are improved greatly, compared with a conventional truck.

What is claimed is:

1. A truck with a hand-operatable bed of which the front side under surface is provided with a pair of front wheels, the rear side under surface is supported by a hydraulic cylinder for lifting or lowering said bed, mounted on a pair of rear wheels by means of bearings, a hydraulic fluid reservoir, an overload-sensing device and an alarm-raising device, comprising:

a chamber;

a pressure relief valve for venting hydraulic fluid from said hydraulic cylinder into said chamber;

an adjustable bias setting spring for controlling the differential pressure point between said hydraulic cylinder and said chamber at which said pressure relief valve opens;

a bore connecting said chamber to said hydraulic fluid reservoir;

a rod including a first end which is positioned in said bore;

said rod first end including a segment dimensioned to fill said bore and prevent fluid flow from said chamber into said hydraulic reservoir;

a rod bias spring for holding said rod first end segment in said bore;

rod support means for supporting said rod so that a second end of said rod is exposed to ambient pressure and said rod can slide relative to said rod support means;

said rod bias spring having a biasing capacity relative to said adjustable bias setting spring for permitting the pressure increase in said chamber relative to ambient pressure created by said pressure relief valve opening to unseat said rod to permit hydraulic fluid to pass from said chamber into said reservoir; and electrical switch means positioned in alignment with said second end of said rod and positioned therefrom by a distance which is traversed by said rod when unseated for changing the state of said electrical switch for activating said alarm-raising device.

2. A truck as defined in claim 1, comprising:

a piston in said hydraulic cylinder responsive to pressurized hydraulic fluid for raising said truck bed;

a pump for pressurizing hydraulic fluid and causing said fluid to be transported from said hydraulic fluid reservoir to said hydraulic cylinder; and valve means for controlling the transfer of hydraulic fluid via fluid couplings from said pump to said hydraulic cylinder in a first position and from said hydraulic cylinder to said hydraulic fluid reservoir in a second position.

3. A truck as defined in claim 2 wherein said valve means includes a neutral position for closing the fluid couplings between said hydraulic cylinder and said pump, and said hydraulic cylinder and said hydraulic fluid reservoir.

4. A truck as defined in claim 3, further comprising:

a handle for manually operating said hydraulic pump and moving and steering said truck; and a control means in said handle for mutually exclusively placing said valve means in said first, second or neutral positions.

5. A truck as defined in claim 3, further including a chain for flexibly coupling said control means to said valve wherein said handle may be operated as a pump handle or steering means without interfering with the operation of said control valve.

6. A hand operated hydraulic lift truck, a load, including a hydraulic fluid reservoir, a hydraulic cylinder, an overload-sensing means and an overload alarm means activated when said overload-sensing means senses an overload, comprising:

a chamber;

a pressure relief valve for venting hydraulic fluid from said hydraulic cylinder into said chamber;

an adjustable bias setting spring for controlling the differential pressure point between said hydraulic cylinder and said chamber at which said pressure relief valve opens;

a bore connecting said chamber to said hydraulic fluid reservoir;

a rod including a first end which is positioned in said bore;

said rod first end including a segment dimensioned to fill said bore and prevent fluid flow from said chamber into said hydraulic reservoir;

a rod bias spring for holding said rod first end segment in said bore;

rod support means for supporting said rod so that a second end of said rod is exposed to ambient pressure and said rod can slide relative to said rod support means;

said rod bias spring having a biasing capacity relative to said adjustable bias setting spring for permitting the pressure increase in said chamber relative to ambient pressure created by said pressure relief valve opening to unseat said rod to permit hydraulic fluid to pass from said chamber into said reservoir; and electrical switch means positioned in alignment with said second end of said rod and positioned therefrom by a distance which is traversed by said rod when unseated for changing the state of said electrical switch for activating said overload alarm means.

7. A truck as defined in claim 6, wherein said hydraulic means includes:
said hydraulic cylinder;
a piston in said hydraulic cylinder responsive to pressurized hydraulic fluid for raising said load;
a pump for pressurizing hydraulic fluid and causing said fluid to be transported from said hydraulic fluid reservoir to said hydraulic cylinder; and
control valve means for controlling the transfer of hydraulic fluid via fluid couplings from said pump to said hydraulic cylinder in a first position and from said hydraulic cylinder to said hydraulic fluid reservoir in a second position.

8. A truck as defined in claim 7 wherein said valve means includes a neutral position for closing the fluid couplings between said hydraulic cylinder and said pump, and said hydraulic cylinder and said hydraulic fluid reservoir.

9. A truck as defined in claim 8, further comprising:
a handle for manually operating said hydraulic pump and moving and steering said truck; and
a control means in said handle for mutually exclusively placing said valve means in said first, second or neutral positions.

10. A truck as defined in claim 9, further including a chain for flexibly coupling said control means to said control valve wherein said handle may be operated as a pump handle or steering means without interfering with the operation of said control valve.

11. A hand-operated hydraulic lift truck including a hydraulic means for lifting or lowering a load, including a hydraulic fluid reservoir, a hydraulic cylinder, an overload-sensing means, and an overload alarm means activated when said overload-sensing means senses and overload, comprising:

a pressure relief valve for venting hydraulic fluid from said hydraulic cylinder into said hydraulic fluid reservoir;

an adjustable bias setting spring for controlling the pressure differential pressure between said hydraulic cylinder and said hydraulic fluid reservoir at which said pressure relief valve opens;

a fluid conduit connecting said hydraulic cylinder to said pressure relief valve;

a rod including a first end which is positioned in said fluid conduit;

a rod bias spring for holding said rod first end a controlled distance into said fluid conduit;

rod support means for supporting said rod so that a second end of said rod is exposed to ambient pressure and said rod can slide relative to said rod support means;

said rod bias spring having a biasing capacity relative to said adjustable bias setting spring for permitting a pressure increase in said hydraulic cylinder relative to ambient pressure to displace said rod within said rod support means; and electrical switch means positioned in alignment with said second end of said rod and positioned therefrom by a distance which is traversed by said rod when displaced for changing the state of said electrical switch for activating said alarm-raising device.

12. A truck as defined in claim 11, wherein said hydraulic means includes:
said hydraulic cylinder;
a piston in said hydraulic cylinder responsive to pressurized hydraulic fluid for raising said load;
a pump for pressurizing hydraulic fluid and causing said fluid to be transported from said hydraulic fluid reservoir to said hydraulic cylinder; and
valve means for controlling the transfer of hydraulic fluid via fluid couplings from said pump to said hydraulic cylinder in a first position and from said hydraulic cylinder to said hydraulic fluid reservoir in a second position.

13. A truck as defined in claim 12 wherein said valve means includes a neutral position for closing the fluid couplings between said hydraulic cylinder and said pump, and said hydraulic cylinder and said hydraulic fluid reservoir.

14. A truck as defined in claim 13, further comprising:
a handle for manually operating said hydraulic pump and moving and steering said truck; and
a control means in said handle for mutually exclusively placing said valve means in said first, second or neutral positions.

15. A truck as defined in claim 14, further including a chain for flexibly coupling said control means to said valve wherein said handle may be operated as a pump handle or steering means without interfering with the operation of said control valve.

* * * * *